:::::: {.columns}
::: {.column}
(12) United States Patent
Tran et al.

(54) CONTOUR ENCRYPTION AND DECRYPTION

(71) Applicant: APDN (B.V.I.) INC. (VG), Roadtown (VG)

(72) Inventors: Phidung H. Tran, East Setauket, NY (US); Minghwa Benjamin Liang, East Setauket, NY (US); Lawrence Jung, Forest Hills, NY (US); James A. Hayward, Stony Brook, NY (US)

(73) Assignee: APDN (B.V.I.) INC., Tortola, B.V.I. (VG)

( * ) Notice: Subject to any disclaimer, the term of this patent is extended or adjusted under 35 U.S.C. 154(b) by 38 days.

(21) Appl. No.: 14/253,641

(22) Filed: Apr. 15, 2014

(65) Prior Publication Data

US 2015/0304109 A1    Oct. 22, 2015

(51) Int. Cl.
| | |
|---|---|
| G06F 21/16 | (2013.01) |
| G09C 5/00 | (2006.01) |
| G06T 1/00 | (2006.01) |
| H04L 9/32 | (2006.01) |

(52) U.S. Cl.
CPC ........ G09C 5/00 (2013.01); G06F 21/16 (2013.01); G06T 1/0021 (2013.01); G06T 2201/0051 (2013.01); H04L 9/32 (2013.01)

(58) Field of Classification Search
None
See application file for complete search history.
:::

::: {.column}
(10) Patent No.: US 9,412,284 B2
(45) Date of Patent: Aug. 9, 2016

(56) References Cited

U.S. PATENT DOCUMENTS

| | | |
|---|---|---|
| 2005/0031120 A1 | 2/2005 | Samid |
| 2009/0313740 A1 | 12/2009 | Santos et al. |
| 2013/0048731 A1* | 2/2013 | Flickner et al. .......... 235/462.12 |

FOREIGN PATENT DOCUMENTS

WO    WO 2013/052924    4/2013

OTHER PUBLICATIONS

International Search Report Dated Jul. 2, 2015.

* cited by examiner

*Primary Examiner* — Benjamin Lanier
(74) *Attorney, Agent, or Firm* — David L. Heath; Algis Anilionis; F. Chau & Associates, LLC

(57) ABSTRACT

A method of encrypting information includes converting an information sequence represented as a strings of bits into a curvilinear coding system, where each element of the curvilinear coding system corresponds to a sub-sequence of successive same-valued bits, converting said curvilinear coding system into a at least one closed curve, and embedding said at least one closed curve in a 2-dimensional pattern. A method for decrypting information includes extracting at least one closed curve from a digitized 2-dimensional pattern, and converting the at least one closed curve into an information sequence represented as a string of bits.

21 Claims, 14 Drawing Sheets
:::
::::::

CONTOUR ENCRYPTION AND DECRYPTION

TECHNICAL FIELD

Embodiments of the present inventive concept are directed to encoding and decoding information in 2-dimensional (2D) curves embedded in a pattern, such as a camouflage pattern.

DISCUSSION OF THE RELATED ART

One way of authenticating merchandise is to attach an identifying marker to the merchandise, such as a trademark, bar code or a QR code that can identify the origin of the merchandise. However, these identifying markers can be detached from the merchandise, and counterfeit merchandise can be affixed with an identifying code that can falsely associate the counterfeit merchandise with the particular manufacturer or origin, normally identified by the particular identifying code.

SUMMARY

Exemplary embodiments of the inventive concept as described herein generally include systems and methods for encoding and decoding information in 2-dimensional (2D) curves. Any type of information that can be encoded as a string of bits, i.e., can be digitized, can also be encoded in a 2D curve. Two exemplary, non-limiting codes of commercial importance that can be encoded in a 2D curve by an embodiment of the inventive concept are the 1-dimensional product bar code and the 2D QR code. A digitized 2D curve can be embedded in a 2D pattern to hide the existence of the 2D curve, and the 2D pattern can be imprinted on or be part of an item of merchandise, such as an article of clothing, a DVD or an integrated circuit, or can be all or part of a product label.

According to an embodiment of the inventive concept, there is provided a method of encrypting information, including converting an information sequence represented as a string of bits into a curvilinear coding system to provide at least one closed curve, and embedding the at least one closed curve in a 2-dimensional pattern.

According to a further embodiment of the inventive concept, the method includes converting each successive substring of same valued bits in the string of bits into an arc, where a radius of each arc corresponds to a number of bits in each sub-sequence and an arc corresponding to a sequence of high-valued bits has a sign opposite to the sign of an arc corresponding to a sequence of low-valued bits, and converting the arc sequence into a closed curve by connecting an end of the arc sequence to a beginning of the arc sequence.

According to a further embodiment of the inventive concept, the method includes converting the string of bits into a plurality of closed curves, and embedding each of the plurality of closed curves in the 2-dimensional pattern.

According to a further embodiment of the inventive concept, one of the plurality of closed curves embedded in the 2-dimensional pattern is a reference curve that includes encoding information of the remaining closed curves, including one or both of a start/end point for each closed curve and a traversal order for the plurality of closed curves.

According to a further embodiment of the inventive concept, the 2-dimensional pattern is a camouflage pattern having a plurality of intensity levels. According to a further embodiment of the inventive concept, the at least one closed curve is a simple closed curve. According to a further embodiment of the inventive concept, the string of bits represents a QR code.

According to a further embodiment of the inventive concept, the method includes receiving a reference point, generating an arc from a substring of same valued bits in the string of bits, where a length of the substring of same-valued bits corresponds to a distance from a selected point on the arc to the reference point, and a value of the bits in the sub-string of same valued bits corresponds a signature of the closed curve with respect to the reference point at the selected point, saving an angle of a vector from the reference point to the selected point with respect to a predefined direction, and repeating the steps of generating an arc and saving an angle until the entire string of bits is converted into a series of arcs. According to a further embodiment of the inventive concept, the method includes, if one or more of the arcs are disconnected, generating connecting arcs between adjacent pairs of disconnected arcs to generate at least one closed curve.

According to a further embodiment of the inventive concept, the method includes receiving a closed boundary curve and a reference point, generating an arc in an interior of the closed boundary curve from a substring of same valued bits in the string of bits, where a length of the substring of same-valued bits corresponds to an offset of arc from the closed boundary curve, and a value of the bits in the sub-string of same valued bits corresponds a signature of the arc, saving a length of a vector from a selected point on the arc to the reference point and an angular offset of the vector with respect to a predetermined direction, and repeating the steps of generating an arc and saving a length and an angular offset until the entire string of bits is converted into a series of arcs.

According to a further embodiment of the inventive concept, if one or more of the arcs at a same offset from the closed boundary curve are disconnected, the method includes, generating connecting arcs between adjacent pairs of disconnected arcs to generate a plurality of nested closed curves enclosed within the closed boundary curve that represent a contour map.

According to a further embodiment of the inventive concept, the method includes generating a plurality of closed curves, where one of the plurality of closed curves is a reference curve, and each of the other closed curves is derived from the reference curve by an affine transformation, where each affine transformations is a combination of at least two transformations selected from a translation, a reflection, a rotation, a scaling transformation, a homothetic transformation, and a shear transformation, where converting the string of bits into the plurality of closed curves comprises converting each sub-string of same-valued bits into one of the plurality of closed curves, where a number of same valued bits corresponds to one of the at least two transformations, and the value of the same valued bits corresponds to the other of the at least two transformations.

According to a further embodiment of the inventive concept, the method includes converting each substring of same-valued bits into a sub-region of an interior of the at least one closed curve, each sub-region being bounded by a pair of parallel line segments having a predetermined separation that extend through the interior of the at least one closed curve and a pair of curve segments, where an area of each the sub-region corresponds to a length of a corresponding substring of same-valued bits, and a value of the same valued bits corresponds to a signature of at least one of the pair of curve segment that bound the sub-region, and appending successive sub-regions along adjacent pairs of parallel line segments where the pairs of curve segments form at least one closed curve.

According to another embodiment of the invention concept, there is provided a non-transitory program storage device readable by a computer, tangibly embodying a program of instructions executed by the computer to perform the method steps for decrypting information, the method including extracting at least one closed curve from a digitized 2-dimensional pattern, and converting the at least one closed curve into an information sequence represented as a string of bits.

According to a further embodiment of the inventive concept, the method includes includes breaking the at least one closed curve into a sequence of arcs, and determining a signature and radius of each arc, and converting the sequence of arcs into the string of bits, where each sub-sequence of successive same valued bits corresponds to an arc, where a length of each sub-sequence corresponds to a radius of each arc, and the value of the bits in each sub-sequence correspond to a signature of each arc. According to a further embodiment of the inventive concept, the 2-dimensional pattern is a camouflage pattern having a plurality of gray levels.

According to a further embodiment of the inventive concept, the method includes extracting a plurality of closed curves from the 2-dimensional pattern, and concatenating the bit string derived from each of the plurality of closed curves into a single bit string that represents the information sequence.

According to a further embodiment of the inventive concept, one of the plurality of closed curves extracted from the 2-dimensional pattern is a reference curve that includes decoding information of the remaining closed curves, including one or both of a start/end point for each closed curve and a traversal order for the plurality of closed curves. According to a further embodiment of the inventive concept, the at least one closed curve is a simple closed curve. According to a further embodiment of the inventive concept, the bit string represents a QR code.

According to a further embodiment of the inventive concept, the method includes extending a vector from a reference point to a selected point on the closed curve, where a length of a vector from the reference point to the selected point corresponds to a number of same valued bits in a sub-string of the string of bits, and a value of the bits in the sub-string of same valued bits is determined by a signature of the closed curve at the selected point.

According to a further embodiment of the inventive concept, the method includes receiving a reference point and an initial angle with respect to a predefined direction, extending a vector from the reference point at the initial angle to a selected point on the closed curve, offsetting the vector by a predetermined angular offset to extend a another vector from the reference point to a another point on the closed curve, and repeating the steps of offsetting the vector by a predetermined angular offset to extend a another vector from the reference point to a another point on the closed curve until the closed curve has been traversed, where a length of the vector corresponds to a number of same valued bits in a sub-string of bits, and a value of the bits in the sub-string of same valued bits is determined by a signature of the closed curve at the point, where at least one closed curve is converted into an information sequence represented as a string of bits.

According to a further embodiment of the inventive concept, the at least one closed curve encloses a plurality of nested closed curves that represent a contour map, where converting the at least one closed curve into a string of bits includes receiving a reference point and an initial angle with respect to a predefined direction, and converting the plurality of nested closed curves into the string of bits by extending a vector from the reference point at the initial angle a predetermined distance to a point on one of the nested closed curves, and by successively offsetting the vector by a predetermined angular offset, where an offset of the one of the nested closed curves from an outer contour of the plurality of nested closed curves corresponds to a number of same valued bits in a sub-string of the string of bits, and a value of the bits in the sub-string of same valued bits is determined by a signature of the one of the nested closed curves at the point.

According to a further embodiment of the inventive concept, a plurality of closed curves are extracted from the digitized 2-dimensional pattern, where one of the plurality of closed curves is a reference curve, and each of the other closed curves is derived from the reference curve by an affine transformation, where each affine transformations is a combination of two or more transformations selected from a translation, a reflection, a rotation, a scaling transformation, a homothetic transformation, and a shear transformation, and where converting the plurality of closed curves into a string of bits comprises converting each of the plurality of closed curves into a sub-string of same-valued bits, where a number of same valued bits corresponds to one of the two or more transformations, and the value of the same valued bits corresponds to the other of the two or more transformations.

According to a further embodiment of the inventive concept, the method includes dividing an interior of the at least one closed curve into sub-regions, each sub-region being bounded by a pair of parallel line segments having a predetermined separation that extend through the interior of the at least one closed curve and a pair of curve segments on each side of the curve, and converting the closed curve into an information sequence represented as a string of bits, where an area of each sub-region corresponds to a number of same valued bits in a substring of the string of bits, and a value of the same valued bits corresponds to a signature of at least one of the pair of curve segment that bound the sub-region.

According to another embodiment of the inventive concept, there is provided a method of encrypting information, including converting an information sequence represented as a string of bits into a curvilinear coding system by converting each successive substring of same valued bits in the string of bits into an arc, where a length of each the substring of same-valued bits corresponds to a distance from a selected point on the arc to a reference point, and a value of the bits in the sub-string of same valued bits corresponds a signature of the arc with respect to the reference point at the selected point, connecting the arcs into a closed curve, and embedding the closed curve in a 2-dimensional pattern.

BRIEF DESCRIPTION OF THE DRAWINGS

Figure 9:
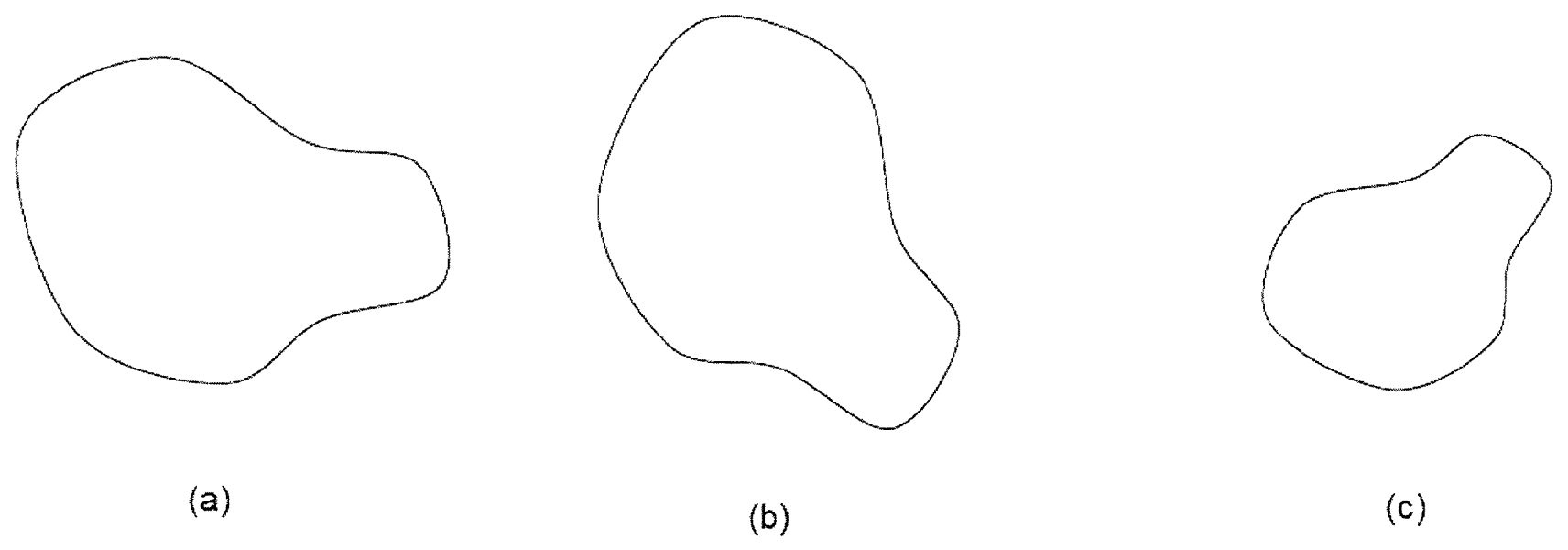

FIGS. 9(a)-(c) depict 3 closed curves, where the curve of FIG. 9(a) is a reference curve, and the curves of FIGS. 9(b)-(c) are created from the reference curve by an affine transformation, according to an embodiment of the inventive concept.

DETAILED DESCRIPTION OF EXEMPLARY EMBODIMENTS

Figure 1:
FIG. 1 shows an example of a camouflage pattern jacket with an embedded identifying QR code, according to an embodiment of the inventive concept.

Exemplary embodiments of the inventive concept as described herein generally include methods for encoding and decoding information in 2-dimensional (2D) curves. Accordingly, while the inventive concept is susceptible to various modifications and alternative forms, specific embodiments thereof are shown by way of example in the drawings and will herein be described in detail. It should be understood, however, that there is no intent to limit the inventive concept to the particular forms disclosed, but on the contrary, the inventive concept is to cover all modifications, equivalents, and alternatives falling within the spirit and scope of the inventive concept.

Figure 2:
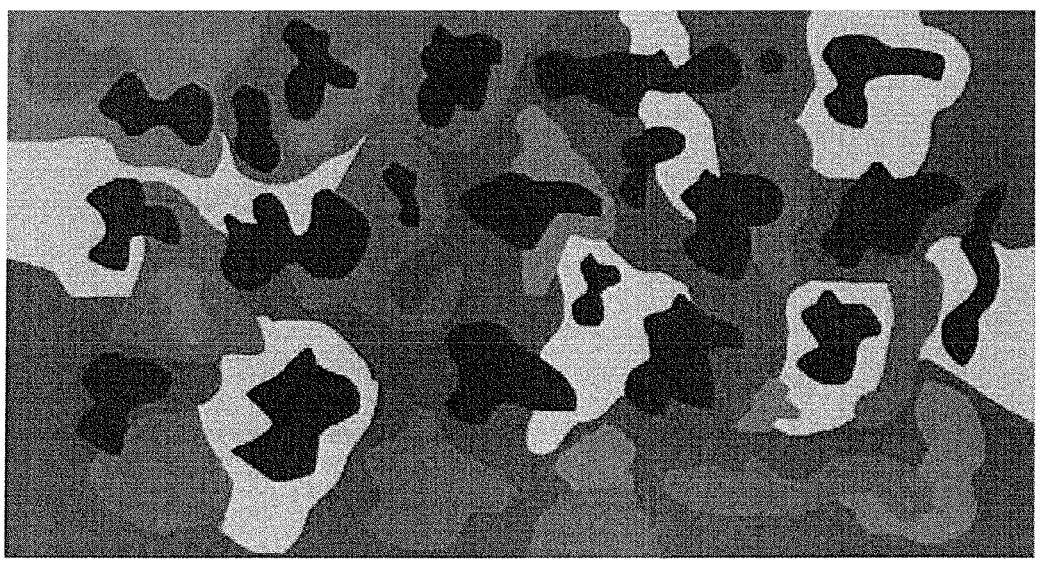
FIG. 2 shows an enlarged portion of the camouflage pattern taken from FIG. 1, according to an embodiment of the inventive concept.
Figure 3:
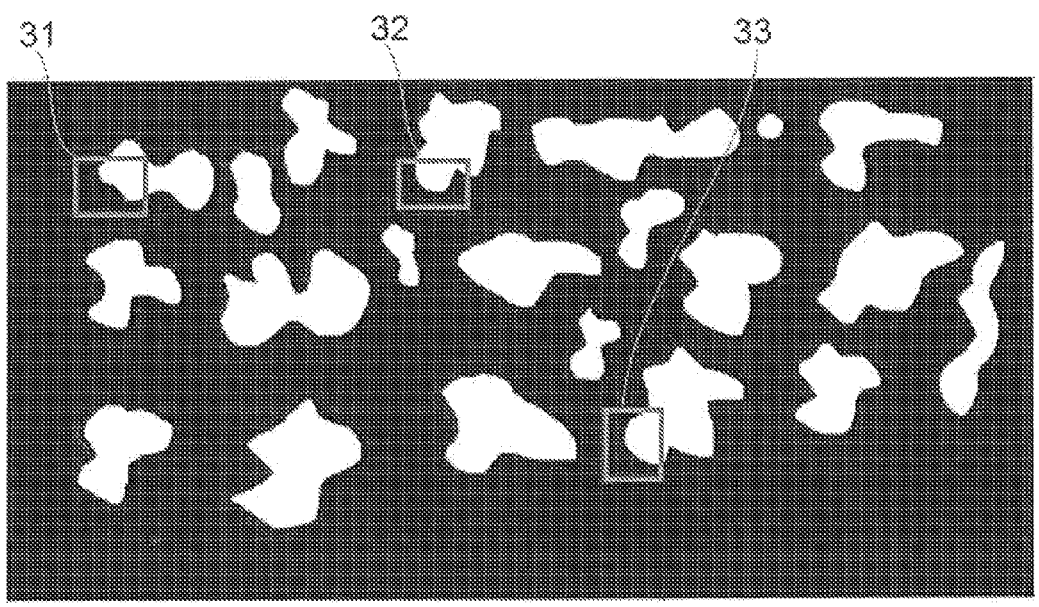
FIG. 3 shows a plurality of white shapes embedded in a black background that result from binarizing the camouflage pattern shown in FIG. 3, according to an embodiment of the inventive concept.
Figure 4:
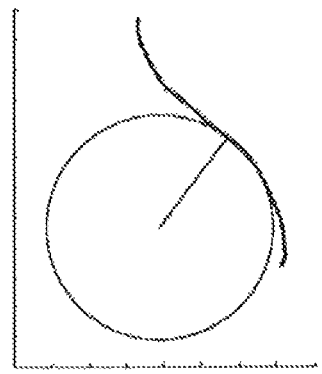
FIGS. 4(a)-(c) shows three exemplary arcs respectively extracted from shapes in FIG. 3, according to an embodiment of the inventive concept.
Figure 4:
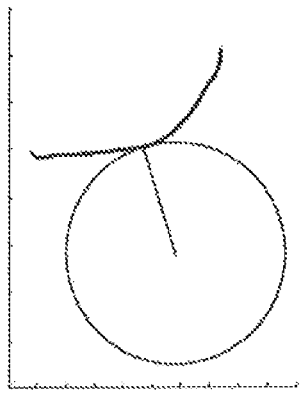
Figure 4:
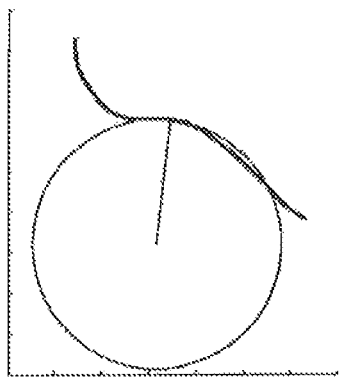
Figure 5:
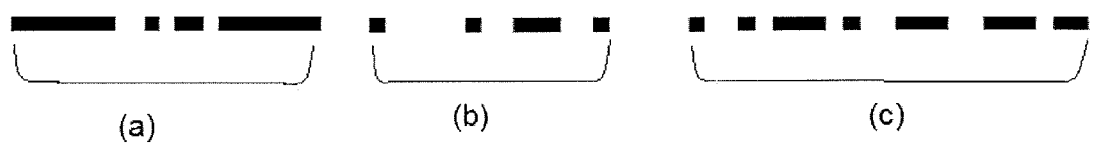
FIGS. 5(a)-(c) show a strings of bits derived from simple closed curves comprising a plurality of arcs of differing signatures and radii, according to an embodiment of the inventive concept.
Figure 6:
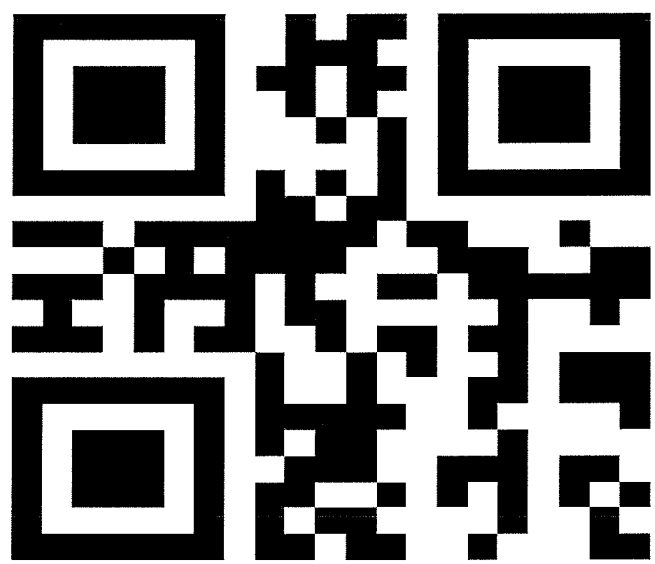
FIG. 6 shows a QR code formed from the string of bits shown in FIG. 5, according to an embodiment of the inventive concept.

One way to ensure that merchandise can be properly authenticated that can prevent counterfeit merchandise from being falsely identified is to embed the identifying marker in the merchandise in such as way that it is essentially hidden from view within the merchandise under normal viewing, but can be revealed through imaging techniques. For example, FIG. 1 shows an example of a camouflage pattern jacket with an embedded identifying QR code. FIG. 2 shows an enlarged portion of the camouflage pattern taken from region 11 of FIG. 1. A camouflage pattern has a plurality of similar colors that can be represented by a plurality of intensity levels. A bit pattern can be hidden in such a pattern by, for example, changing the values of the two lowest order bits. This type of encoding would render the bit pattern essentially indistinguishable from the camouflage pattern. This camouflage pattern can be binarized into a black and white image using a specified color key software, shown in FIG. 3. FIG. 3 shows a plurality of white shapes embedded in a black background. Note that the choice of a black background is exemplary and non-limiting and the specified color key software could generate black shapes on a white background. The boundaries between the shapes and the background can be represented by 2-dimensional (2D) simple closed curves, each having a well defined interior, namely the interior of the shape, and a well defined exterior, the background. Once a start/end for each curve is defined, the curve can be broken down into a connected sequence of arcs. A signature of an arc, which may be positive or negative, can be determined by whether the arc is concave inward to the interior of the simple closed curve, or concave outward toward the exterior. Given a set of 2D simple closed curves, existing mathematical computing environments, such as MATLAB, available from MathWorks, provide built-in functions that can extract an arc from a curve and determine its radius and center, as illustrated in FIGS. 4(a)-(c). FIGS. 4(a)-(c) shows three exemplary arcs respectively extracted from shapes 31, 32, and 33 in FIG. 3. Thus, a simple closed curve comprising a plurality of arcs of differing signatures and radii can be converted into a string of bits, illustrated in FIGS. 5(a)-(c), by associating the signature to a bit value, and the radii to a bit length. The string of bits can represent all, or a portion of, a product code such as a bar code, or the QR code illustrated in FIG. 6.

In other embodiments of the inventive concept, the plurality of arcs may be joined together to form a plurality of 2-dimensional curves, and an array of such curves can be embedded in the camouflage pattern. In addition, in other embodiments of the inventive concept, one of the array of curves may be a reference curve that includes encoding information for the remaining curves. This encoding information may include one or both of a start and end point of the curves, a traversal order of the array of curves, and a type of information encoded by the curves, such as whether the curves represent a QR code. If the array of curves does represent a QR code, the reference curve may further include information on the size of the QR code, and how the QR code is broken into the individual closed curves. The information on the start and end point of each curve may include, for example, a centroid point of the interior of each curve, and an offset angle through the centroid whose intersection with the curve is the start/end point. According to embodiments of the inventive concept, the reference curve may be an upper left curve in an array of curves. However, this reference curve location is exemplary and non-limiting, and that the reference curve may located anywhere among the array of curves.

FIGS. 7-10 illustrate other methods of encoding information in contours according to other embodiments of the inventive concept.

Figure 7:
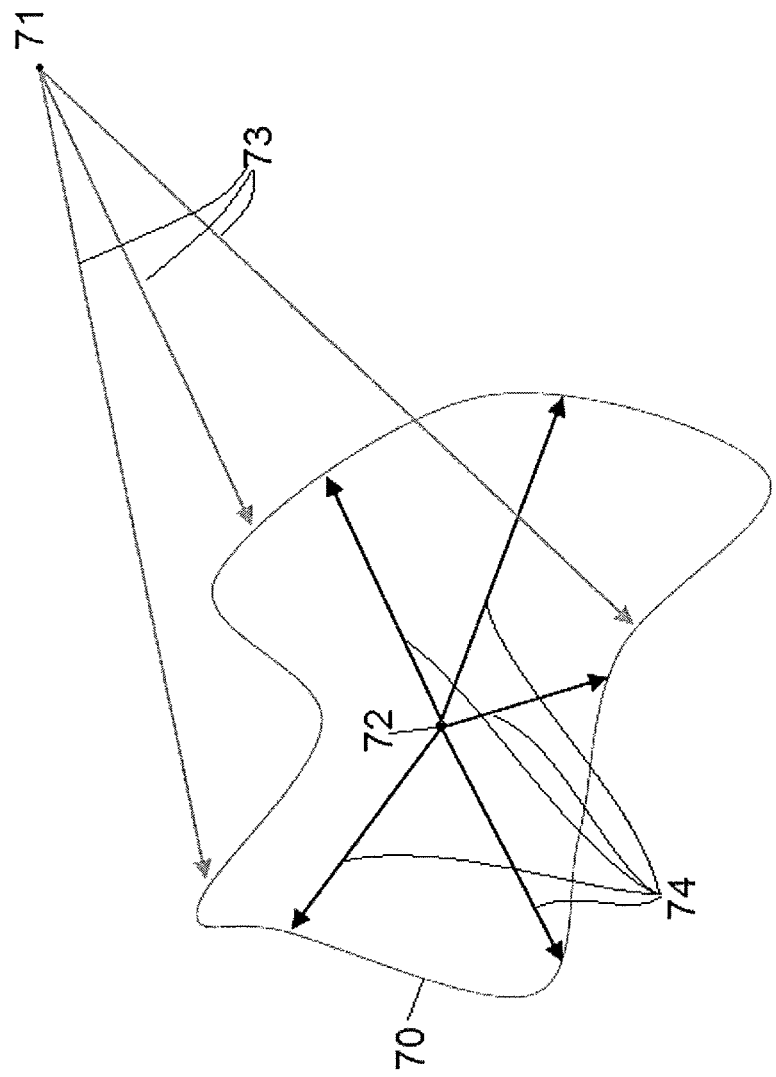
FIG. 7 depicts a closed curve with two reference points from which vectors are respectively projected, according to an embodiment of the inventive concept.
Figure 8:
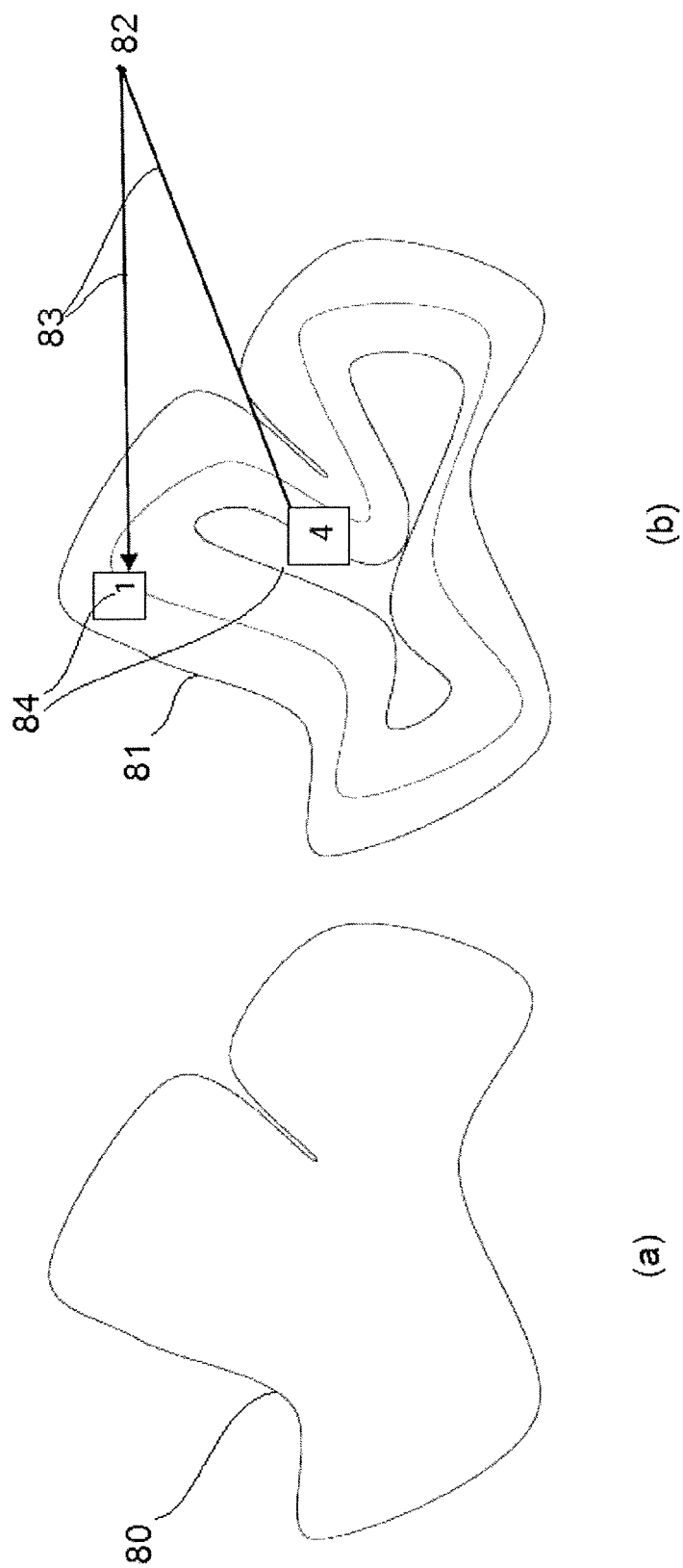
FIG. 8(a) depicts a closed curve 80 that represents an outer boundary of a contour map, according to an embodiment of the inventive concept.
FIG. 8(b) depicts a contour map comprising a plurality of nested curves formed by offsetting the closed curve of FIG. 8(a), and a reference point from which vectors are projected to points in the contour map, according to an embodiment of the inventive concept.

FIG. 7 depicts a closed curve 70 with two reference points 71, 72, from which vectors 73, 74 are respectively projected. The reference point 72 may be a centroid of the region bounded by the closed curve, but is not limited thereto. In either case, the length of the vector from the reference point to a point on the curve corresponds to a length of same-valued bits, and the signature of the curve, i.e. whether the curve is concave/convex at the curve point corresponds to the bit value. A next subsequence of same-valued bits is found by advancing the vector from the reference point by a pre-specified angular offset.

FIG. 8(a) depicts a closed curve 80 that represents an outer boundary of a contour map, while FIG. 8(b) depicts a contour map 81 comprising a plurality of nested curves formed by offsetting the closed curve of FIG. 8(a), and a reference point 82 from which vectors 83 are projected to points 84 in the contour map 81. New curves may be defined at fixed increments inward from outer boundary until a curve crosses itself. The inward curves may define a height above the outer boundary. The initial point corresponding to the beginning of an information sequence may be found by extending an initial vector 83 a predetermined distance from the reference point 82. The predetermined distance may be found in a data base. The number of same-valued bits corresponds to the contour height at the initial point, and the bit value is given by the concavity/convexity of the curve at that point. The next point is found by offsetting the initial vector 83 by a predetermined angular increment that may also be found in the data base, and extending the vector by a predetermined distance to a point on one of the plurality of nested curves.

FIGS. 9(a)-(c) depict 3 closed curves, where the curve of FIG. 9(a) may be regarded as a reference curve. Other curves, such as those illustrated in FIG. 9(b)-(c), may be created from the reference curve by an affine transformation, where each successive curve is associated with a subsequent sub-sequence of same-valued bits. The affine transformations may be a combination of two or more of a translation, a reflection, a rotation, a scaling transformation, a homothetic transformation, and a shear mapping. For example, the translation distance, degree of scaling, magnitude of tilt due to shear, etc., may correspond to the number of same-valued bits in the information sequence, while reflection or the angular offset of the rotation corresponds to the bit value. For instance, an exemplary, non-limiting bit value encoding may be that the $1^{st}$ n degrees angular offset represents 1, the $2^{nd}$ n degrees represents 0, the $3^{rd}$ n degrees represents 1, etc. Note that the preceding scheme used to map the rotation offset to the bit value may also be used with translation, scaling or shear. The encoding scheme may be determined from the data base.

Figure 10:
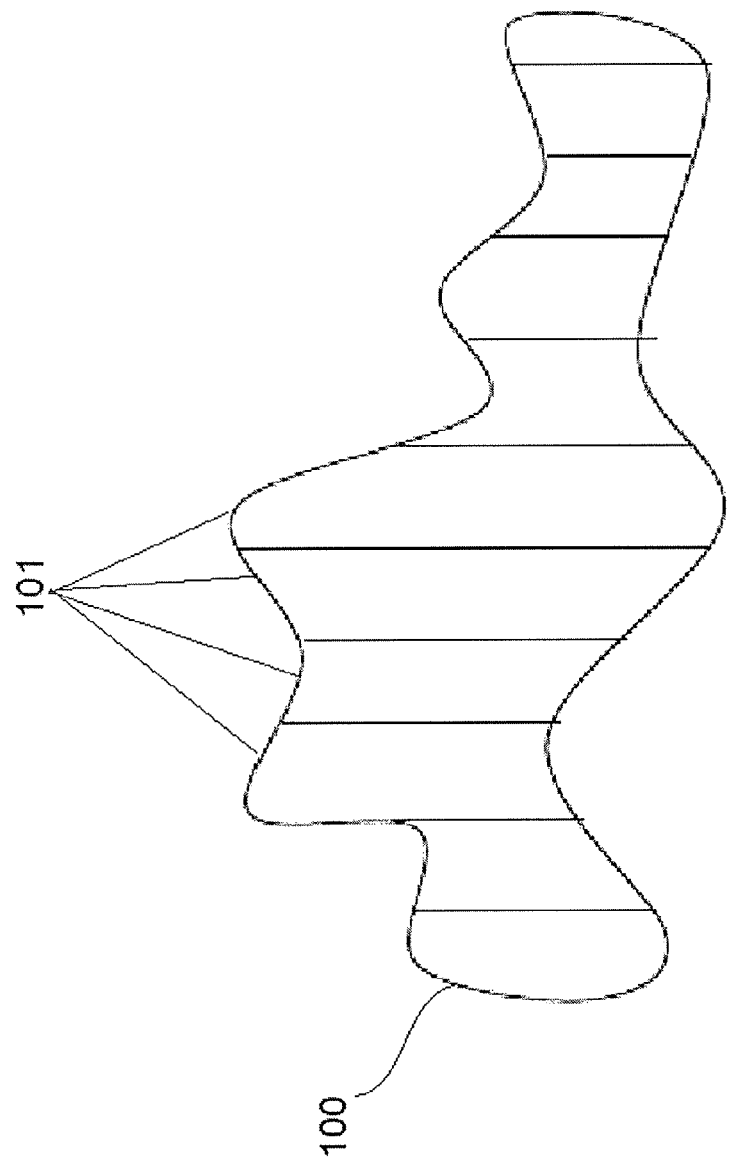
FIG. 10 depicts another curve whose interior is divided into sub-regions, where each sub-region corresponds to a sub-sequence of same-valued bits, according to an embodiment of the inventive concept.

FIG. 10 depicts another curve 100 whose interior is divided into sub-regions 101, where each sub-region corresponds to a sub-sequence of same-valued bits. Note that, for clarity, only some of the sub-regions 101 are indicated in the figure. The area of each sub-region may correspond to the number of same-valued bits, while the bit value may be determined by the concavity/convexity of the boundary curves at either end. For example, a concave upper curve may be 0, any other combination may be 1. Other combination definitions are possible.

In other embodiments of the inventive concept, an object may have a marker, e.g. a star, that contains a key to a secret data base that contains all information for reading the contour codes, e.g., a definition of the vertical, a location of a reference point, and an angular offset to the next curve point, etc.

Figure 11A:
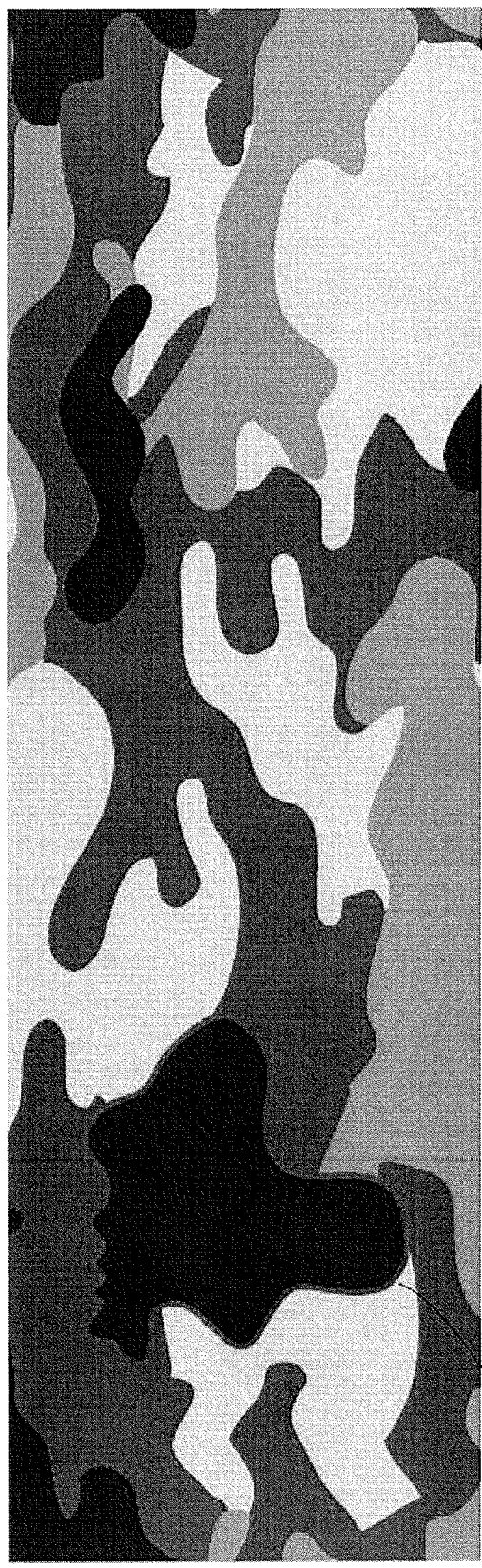
FIGS. 11(a)-(c) illustrate an example of converting a closed curve into a string of bits, according to an embodiment of the inventive concept.
Figure 11B:
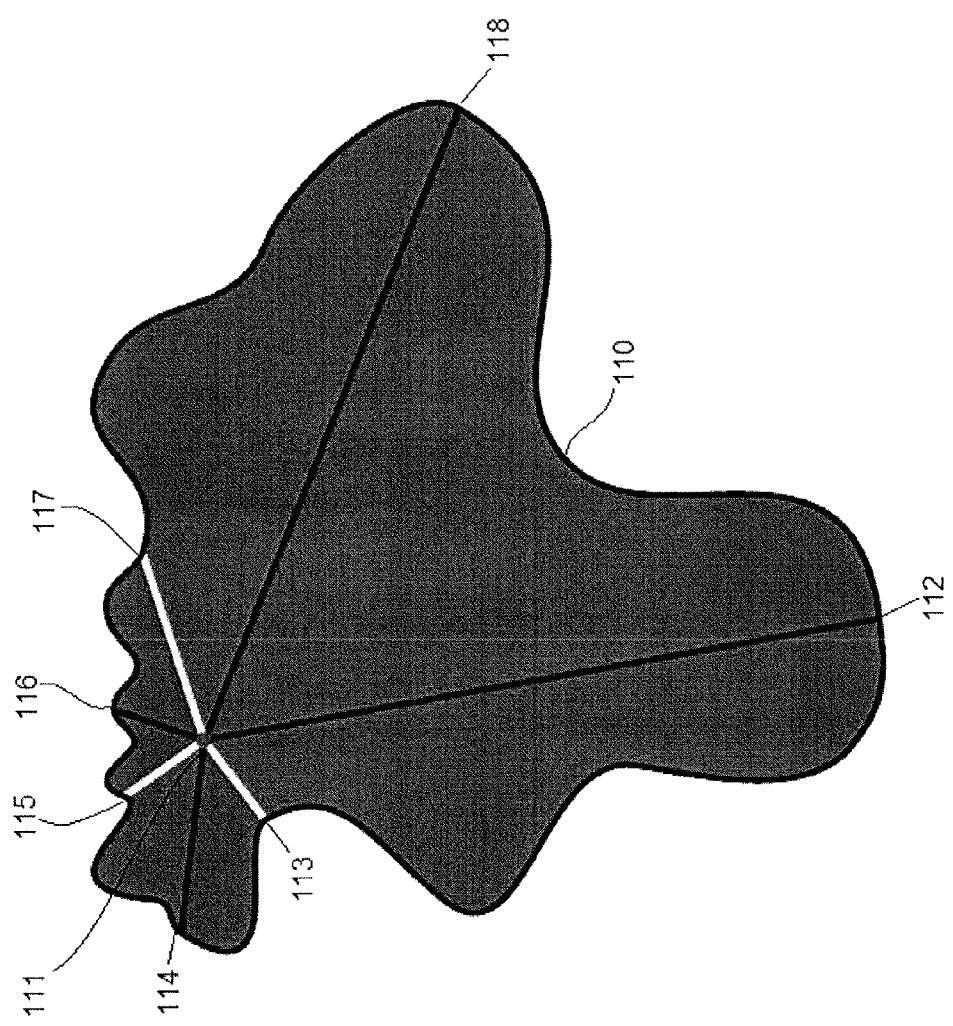
Figure 11C:
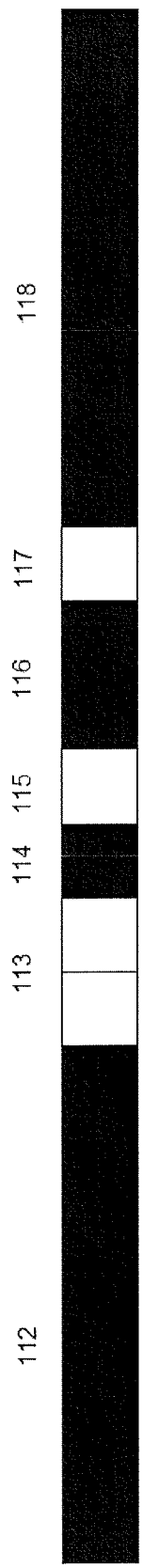

FIGS. 11(a)-(c) illustrate an example of converting a close curve into a string of bits, according to an embodiment of the inventive concept. FIG. 11(a) depicts a curve 110 embedded in a camouflage pattern, and FIG. 11(b) depicts the curve 110 extracted from the camouflage pattern. FIG. 11(b) further depicts a reference point 111 and a plurality of vectors 112, 113, 114, 115, 116, 117, and 118 that extend from the reference point to the curve 110. The location of the reference point 111 and the angular offsets of each of the vectors 112 to 118 may be read from the above-referenced secret data base.

A set of exemplary, non-limiting angular offsets may be 0°, 40°, 53°, 54°, 48°, 44°, and 62°, for vectors 112, 113, 114, 115, 16, 117, and 118, respectively. Note that in this example the angular offset is the angle between successive vectors. The value of the bit sub-string associated with each vector may be determined by the signature of the arc where the vector intersects the curve. In this example, a value of 0 or black is associated with an arc that is concave outward, and a value of 1 or white is associated with an arc that is concave inward. In addition, the number of same valued bits corresponds to the length of the associated vector. A set of exemplary, non-limiting bit lengths may be 7 black, 2 white, 1 black, 1 white, 2 black, 1 white, and 7 black bits for vectors 112, 113, 114, 115, 16, 117, and 118, respectively. Note that the apparent length of the vectors 112 to 118 as shown in FIG. 11(b) does not necessarily correspond to the associated number of bits. FIG. 11(c) depicts a bit string derived from curve 110, where the reference number of each substring of same valued bits corresponds to the associated vector in FIG. 11(b).

Figure 12:
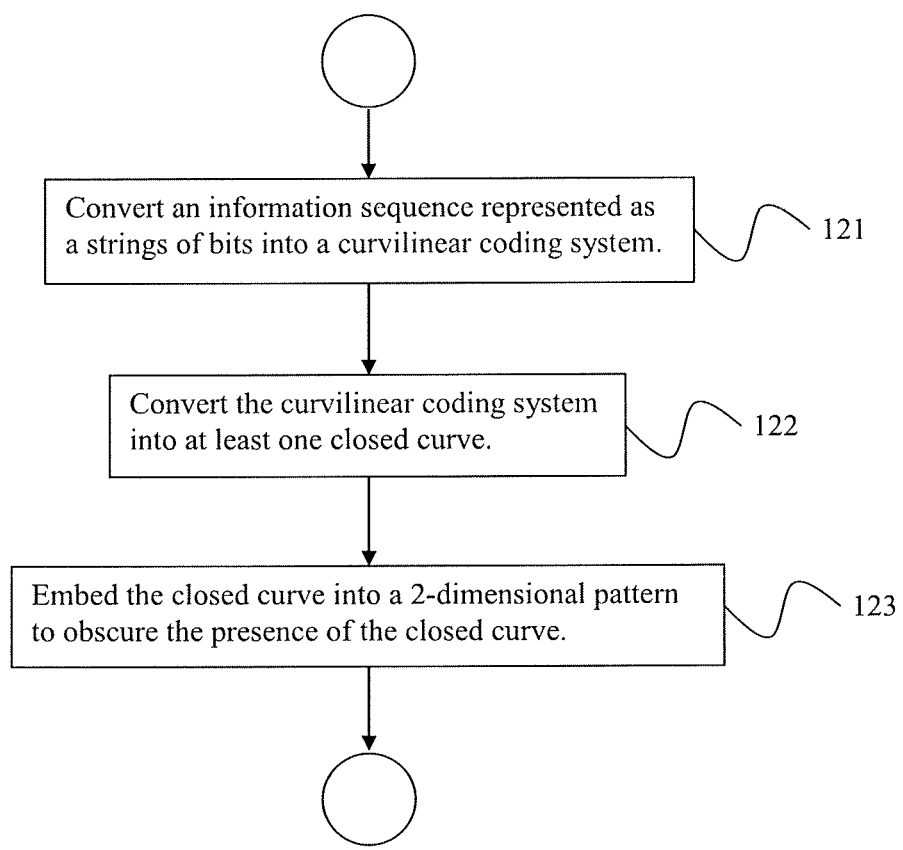
FIG. 12 is a flow chart of a method of encrypting information in a sequence of contours, according to an embodiment of the inventive concept.

FIG. 12 is a flow chart of a method of converting an information sequence represented as a string of bits into a curvilinear coding system to provide at least one closed curve, according to an embodiment of the inventive concept. An information sequence may be represented as a string of bits, where each bit has one of a low value and a high value, commonly represented as a 0 and a 1, respectively. The string of bits can be representative of, for example, all or a portion of a product bar code or a QR code. The string of bits will include sub-sequences of successive 1-bites and 0-bits. Referring now to the figure, a method begins at step 121 by converting the information sequence into a curvilinear coding system. An exemplary, non-limiting curvilinear coding system is a sequence of arcs, where each element of the non-limiting curvilinear coding system is an arc that corresponds to a sub-sequence of successive same-valued bits. A radius of each arc corresponds to a number of bits in each sub-sequence and an arc corresponding to a sequence of high-valued bits has a signature opposite to the signature of an arc corresponding to a sequence of low-valued bits. For example, according to an embodiment of the inventive concept, the radius of the arc for a string of 0-bits may point in the opposite direction of the radius of the arc for a string of 1-bits. Since a bit-string may include a plurality of sub-sequences of successive 1-bits and a plurality of sub-sequences of 0-bits, a plurality of arcs would be generated.

At step 122, the curvilinear coding system represented as a sequence of arcs is converted into a closed curve by joining an end point of the arc sequence to a start point of the arc sequence. According to an embodiment of the inventive concept, the close curve may be a planar simple closed curve. A planar curve is embedded in a plane, as opposed to a curved surface, and a simple closed curve does not intersect itself. A well known property of a simple closed curve is that it divides a plane into two disjoint sets, namely the interior of the curve, and the exterior of the curve. According to an embodiment of the inventive concept, the end point may be connected to the start point so that an arc representative of a sub-sequence of 0-bits is concave inward into the closed curve, and an arc representative of a sub-sequence of 1-bits is concave outward from the closed curve. Alternatively, according to another embodiment of the inventive concept, the end point may be connected to the start point so that an arc representative of a sub-sequence of 0-bits is concave outward from the closed curve, and an arc representative of a sub-sequence of 1-bits is concave inward into the closed curve.

At step 123, the closed curve is embedded into a 2-dimensional pattern in such a way as to obscure the presence of the closed curve. According to an embodiment of the inventive concept, the pattern may be a digitized camouflage pattern that has a plurality of gray levels, and the closed curve may be encoded in the two least significant bits. This process of hiding data is an example of steganography, which is the process of hiding messages, either encrypted or unencrypted, in such a way that no one, apart from the sender and intended recipient, suspects the existence of the message.

Figure 13:
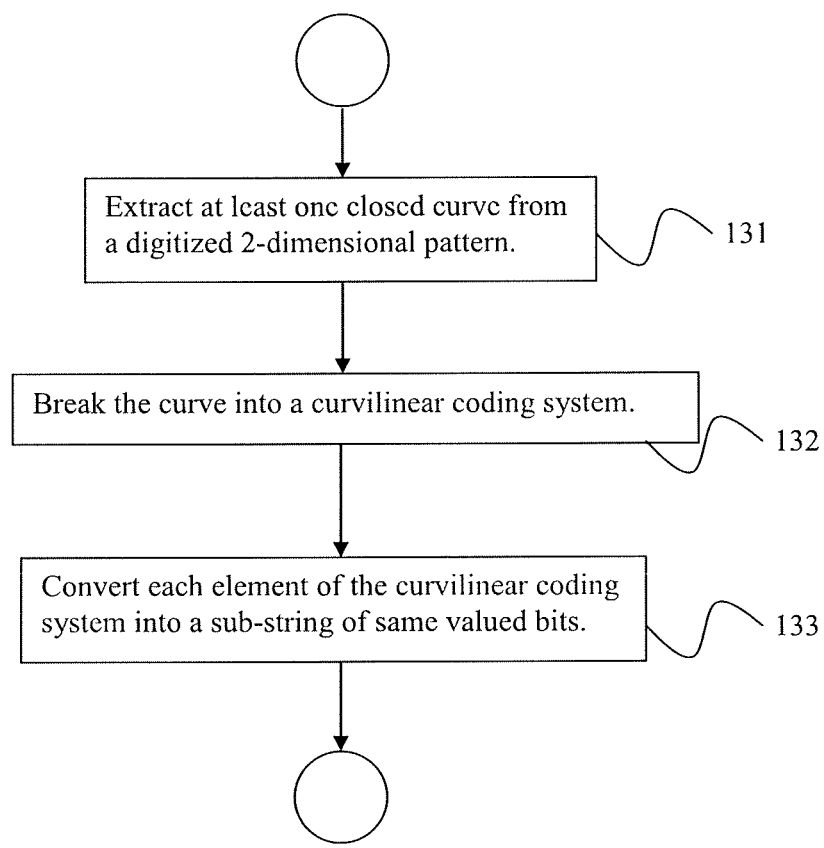
FIG. 13 is a flow chart of a method of decrypting information encoded in a sequence of contours, according to an embodiment of the inventive concept.

FIG. 13 is a flow chart of a method of decrypting information encoded in a sequence of contours, according to an embodiment of the inventive concept. Referring now to the figure, a method begins at step 131 by extracting at least one closed curve from a digitized 2-dimensional pattern. According to embodiments of the inventive concept, the 2-dimensional pattern may be a camouflage pattern that has a plurality of gray levels. In other embodiments of the inventive concept, a plurality of closed curves may be extracted from the 2-dimensional pattern. According to embodiments of the inventive concept, each closed curve may be a simple closed curve. At step 132, the at least one curve is broken into a curvilinear coding system. An exemplary, non-limiting curvilinear coding system is a sequence of arcs, where each arc represents an element of the curvilinear coding system. Then, at step 133, each arc in the sequence of arcs is converted into a sub-string of same-values bits, in which a length of each sub-sequence corresponds to a radius of each arc, and the value of the bits in each sub-sequence correspond to a signature of each arc. According to embodiments of the inventive concept, the bit string may represent a QR code. Further, as disclosed above, one of the plurality of closed curves extracted from the 2-dimensional pattern may be reference curve that includes decoding information for the remaining closed curves.

As described above, any type of information that can be encoded as a string of bits, i.e., can be digitized, can also be encoded in a 2D curve by a method according to an embodiment of the inventive concept. Two exemplary, non-limiting codes of commercial importance that can be encoded in a 2D curve by an embodiment of the inventive concept are the 1-dimensional product bar code and the 2D QR code. Further, as described above, a digitized 2D curve can be embedded in a 2D pattern to hide the existence of the 2D curve, and the 2D pattern can be imprinted on or be part of an item of merchandise, such as an article of clothing, a DVD or an integrated circuit, or can be all or part of a product label.

It is to be understood that embodiments of the present inventive concept can be implemented in various forms of hardware, software, firmware, special purpose processes, or a combination thereof. In one embodiment, the present inventive concept can be implemented in software as an application program tangibly embodied on a computer readable program storage device. The application program can be uploaded to, and executed by, a machine comprising a suitable architecture, such as a central processing unit (CPU) of a computer such as a workstation, a desktop computer, a laptop computer, a tablet, or a smartphone.

Figure 14:
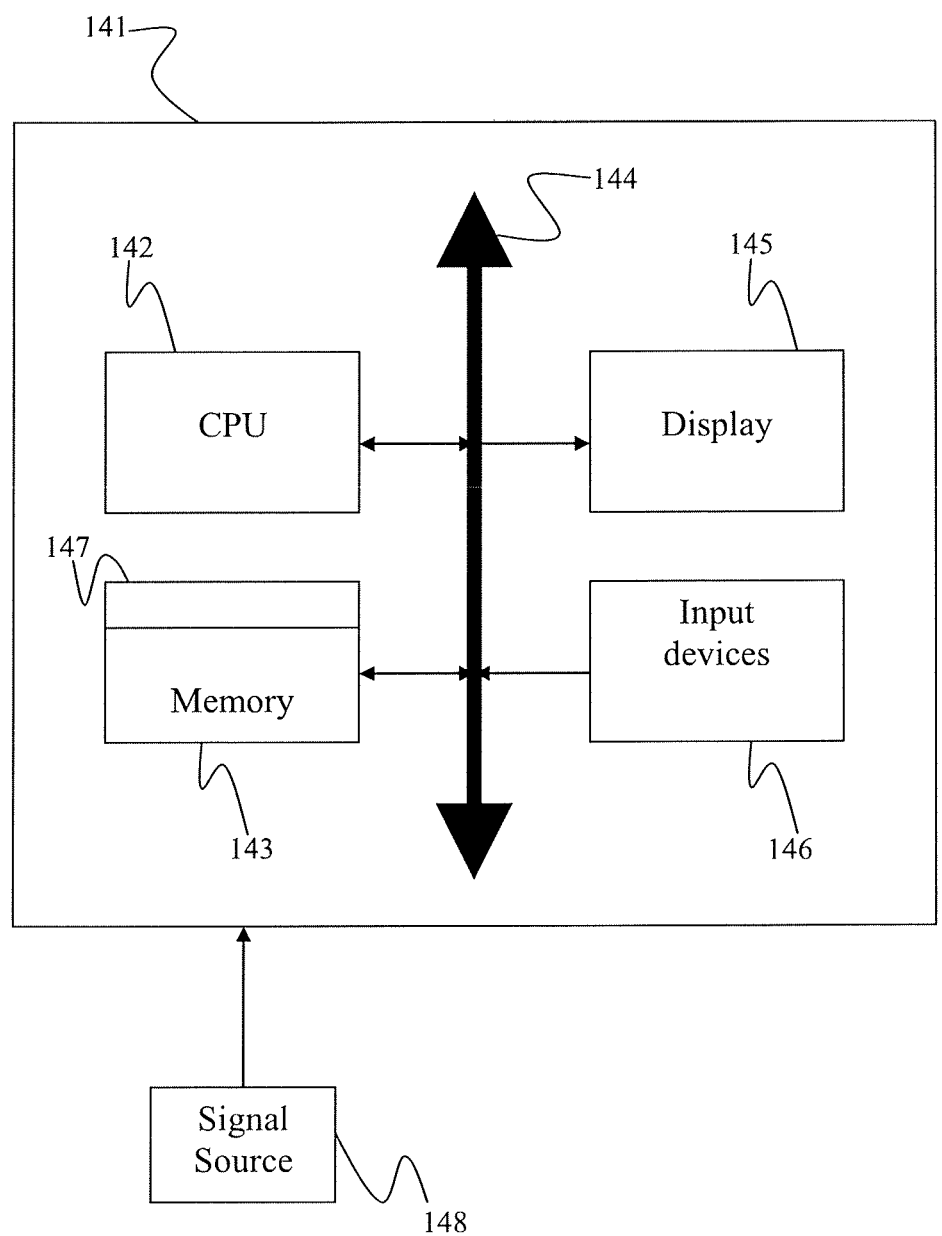
FIG. 14 is a block diagram of an exemplary computer system for implementing a method for encoding and decoding information in 2-dimensional (2D) curves, according to an embodiment of the inventive concept.

FIG. 14 is a block diagram of an exemplary computer system for implementing a method for encoding and decoding information in 2-dimensional (2D) curves, according to an embodiment of the invention. Referring now to FIG. 14, a computer system 141 for implementing the present invention can comprise, inter cilia, a central processing unit (CPU) 142, a memory 143 and an input/output (I/O) interface 144. The computer system 141 is generally coupled through the I/O interface 144 to a display 145 and various input devices 146 such as a mouse and a keyboard. The support circuits can include circuits such as cache, power supplies, clock circuits, and a communication bus. The memory 143 can include random access memory (RAM), read only memory (ROM), disk drive, tape drive, etc., or a combinations thereof. The present invention can be implemented as a routine 147 that is stored in memory 143 and executed by the CPU 142 to process the signal from the signal source 148. As such, the computer system 141 is a general purpose computer system that becomes a specific purpose computer system when executing the routine 147 of the present invention.

The computer system 141 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present inventive concept provided herein, one of ordinary skill in the related art will be able to contemplate these and similar implementations or configurations of the present inventive concept.

While the present inventive concept has been described in detail with reference to exemplary embodiments, those skilled in the art will appreciate that various modifications and substitutions can be made thereto without departing from the spirit and scope of the invention as set forth in the appended claims.

What is claimed is:

1. A method of encrypting information, comprising the steps of:
    converting an information sequence represented as a string of bits into a curvilinear coding system to provide at least one closed curve; and
    embedding said at least one closed curve in a 2-dimensional pattern and embedding the 2-dimensional pattern on an article of merchandise,
    wherein converting a string of bits into a curvilinear coding system to provide at least one closed curve comprises:
    converting each successive substring of same valued bits in said string of bits into an arc, wherein a radius of each arc corresponds to a number of bits in each sub-sequence and an arc corresponding to a sequence of high-valued bits having a sign opposite to the sign of an arc corresponding to a sequence of low-valued bits; and
    converting said arc sequence into a closed curve by connecting an end of said arc sequence to a start of said arc sequence.

2. The method of claim 1, further comprising converting said string of bits into a plurality of closed curves, and embedding each of said plurality of closed curves in said 2-dimensional pattern.

3. The method of claim 1, wherein the at least one closed curve is a simple closed curve.

4. The method of claim 1, wherein the string of bits represents a QR code.

5. A method of encrypting information, comprising the steps of:
    converting an information sequence represented as a string of bits into a curvilinear coding system to provide at least one closed curve; and
    embedding said at least one closed curve in a 2-dimensional pattern and embedding the 2-dimensional pattern on an article of merchandise, wherein said 2-dimensional pattern is a camouflage pattern having a plurality of intensity levels.

6. The method of claim 5, further comprising converting said string of bits into a plurality of closed curves, and embedding each of said plurality of closed curves in said 2-dimensional pattern, wherein one of said plurality of closed curves embedded in said 2-dimensional pattern is a reference curve that includes encoding information of the remaining closed curves, including either one or both of a start/end point for each closed curve and a traversal order for the plurality of closed curves.

7. The method of claim 5, wherein converting a string of bits into a curvilinear coding system to provide at least one closed curve comprises:
receiving a reference point;
generating an arc from a substring of same valued bits in said string of bits, wherein a length of said substring of same-valued bits corresponds to a distance from a selected point on said arc to said reference point, and a value of the bits in the sub-string of same valued bits corresponds to a signature of the closed curve with respect to the reference point at said selected point;
saving an angle of a vector from the reference point to the selected point with respect to a predefined direction; and
repeating said steps of generating an arc and saving an angle until the entire string of bits is converted into a series of arcs,
wherein, if one or more of said arcs are disconnected, generating connecting arcs between adjacent pairs of disconnected arcs to generate at least one closed curve.

8. The method of claim 5, wherein converting a string of bits into a curvilinear coding system to provide at least one closed curve comprises:
receiving a closed boundary curve and a reference point;
generating an arc in an interior of said closed boundary curve from a substring of same valued bits in said string of bits, wherein a length of said substring of same-valued bits corresponds to an offset of arc from said closed boundary curve, and a value of the bits in the sub-string of same valued bits corresponds to a signature of said arc;
saving a length of a vector from a selected point on said arc to the reference point and an angular offset of said vector with respect to a predetermined direction; and
repeating said steps of generating an arc and saving a length and an angular offset until the entire string of bits is converted into a series of arcs,
wherein, if one or more of said arcs at a same offset from the closed boundary curve are disconnected, generating connecting arcs between adjacent pairs of disconnected arcs to generate a plurality of nested closed curves enclosed within said closed boundary curve that represent a contour map.

9. The method of claim 5, wherein converting a string of bits into a curvilinear coding system to provide at least one closed curve comprises:
generating a plurality of closed curves,
wherein one of said plurality of closed curves is a reference curve, and each of the other closed curves is derived from the reference curve by an affine transformation, wherein each affine transformations is a combination of at least two transformations selected from a translation, a reflection, a rotation, a scaling transformation, a homothetic transformation, and a shear transformation,
wherein converting said string of bits into said plurality of closed curves comprises converting each sub-string of same-valued bits into one of said plurality of closed curves, wherein a number of same valued bits corresponds to one of said at least two transformations, and the value of the same valued bits corresponds to the other of said at least two transformations.

10. The method of claim 5, wherein converting a string of bits into a curvilinear coding system to provide at least one closed curve comprises:
converting each substring of same-valued bits into a sub-region of an interior of the at least one closed curve, each sub-region being bounded by a pair of parallel line segments having a predetermined separation that extend through the interior of said at least one closed curve and a pair of curve segments,
wherein an area of each said sub-region corresponds to a length of a corresponding substring of same-valued bits, and a value of the same valued bits corresponds to a signature of at least one of said pair of curve segment that bound the sub-region; and
appending successive sub-regions along adjacent pairs of parallel line segments wherein said pairs of curve segments form at least one closed curve.

11. A non-transitory program storage device readable by a computer, tangibly embodying a program of instructions executed by the computer to perform the method steps for decrypting information, the method comprising the steps of:
extracting at least one closed curve from a digitized image of a 2-dimensional pattern embedded on an article of merchandise;
converting said at least one closed curve into an information sequence represented as a string of bits, wherein the information sequence represents authenticating information of the article of merchandise; and authenticating said article of merchandise from the information sequence,
wherein converting said at least one closed curve into a string of bits comprises:
resolving said at least one closed curve into a sequence of arcs, and determining a signature and radius of each arc; and
converting said sequence of arcs into said string of bits, wherein each sub-sequence of successive same valued bits corresponds to an arc, wherein a length of each sub-sequence corresponds to a radius of each arc, and the value of the bits in each sub-sequence corresponds to a signature of each arc.

12. The computer readable program storage device of claim 11, the method further comprising extracting a plurality of closed curves from said 2-dimensional pattern, and concatenating the bit string derived from each of the plurality of closed curves into a single bit string that represents the information sequence.

13. The computer readable program storage device of claim 11, wherein the at least one closed curve is a simple closed curve.

14. The computer readable program storage device of claim 11, wherein the bit string represents a QR code.

15. A non-transitory program storage device readable by a computer, tangibly embodying a program of instructions executed by the computer to perform the method steps for decrypting information, the method comprising the steps of:
extracting at least one closed curve from a digitized image of a 2-dimensional pattern embedded on an article of merchandise;
converting said at least one closed curve into an information sequence represented as a string of bits, wherein said 2-dimensional pattern is a camouflage pattern having a plurality of gray levels wherein the information sequence represents authenticating information of the article of merchandise and authenticating said article of merchandise from the information sequence.

16. The computer readable program storage device of claim 15, the method further comprising extracting a plurality of closed curves from said 2-dimensional pattern, and concatenating the bit string derived from each of the plurality of closed curves into a single bit string that represents the information sequence, wherein one of said plurality of closed curves extracted from said 2-dimensional pattern is a reference curve that includes decoding information of the remaining closed curves, including one or both of a start/end point for each closed curve and a traversal order for the plurality of closed curves.

17. The computer readable program storage device of claim 15, wherein converting said at least one closed curve into a string of bits comprises:
  extending a vector from a reference point to a selected point on said closed curve; wherein a length of a vector from said reference point to said selected point corresponds to a number of same valued bits in a sub-string of said string of bits, and a value of the bits in the sub-string of same valued bits is determined by a signature of the closed curve at said selected point.

18. The computer readable program storage device of claim 15, wherein converting said at least one closed curve into a string of bits comprises:
  receiving a reference point and an initial angle with respect to a predefined direction;
  extending a vector from the reference point at the initial angle to a selected point on said closed curve;
  offsetting said vector by a predetermined angular offset to extend a another vector from the reference point to a another point on said closed curve; and
  repeating said steps of offsetting said vector by a predetermined angular offset to extend a another vector from the reference point to a another point on said closed curve until said closed curve has been traversed,
  wherein a length of the vector corresponds to a number of same valued bits in a sub-string of bits, and a value of the bits in the sub-string of same valued bits is determined by a signature of the closed curve at said point, wherein at least one closed curve is converted into an information sequence represented as a string of bits.

19. The computer readable program storage device of claim 15, wherein the at least one closed curve encloses a plurality of nested closed curves that represent a contour map, wherein converting said at least one closed curve into a string of bits comprises:
  receiving a reference point and an initial angle with respect to a predefined direction; and
  converting said plurality of nested closed curves into said string of bits by extending a vector from the reference point at the initial angle a predetermined distance to a point on one of said nested closed curves, and by successively offsetting said vector by a predetermined angular offset,
  wherein an offset of the one of said nested closed curves from an outer contour of said plurality of nested closed curves corresponds to a number of same valued bits in a sub-string of said string of bits, and a value of the bits in the sub-string of same valued bits is determined by a signature of the one of said nested closed curves at said point.

20. The computer readable program storage device of claim 15, wherein a plurality of closed curves are extracted from said digitized 2-dimensional pattern,
  wherein one of said plurality of closed curves is a reference curve, and each of the other closed curves is derived from the reference curve by an affine transformation, wherein each affine transformations is a combination of two or more transformations selected from a translation, a reflection, a rotation, a scaling transformation, a homothetic transformation, and a shear transformation; and
  wherein converting said plurality of closed curves into a string of bits comprises converting each of the plurality of closed curves into a sub-string of same-valued bits, wherein a number of same valued bits corresponds to one of said two or more transformations, and the value of the same valued bits corresponds to the other of said two or more transformations.

21. The computer readable program storage device of claim 15, wherein converting said at least one closed curve into a string of bits comprises:
  dividing an interior of said at least one closed curve into sub-regions, each sub- region being bounded by a pair of parallel line segments having a predetermined separation that extend through the interior of said at least one closed curve and a pair of curve segments on each side of said curve; and
  converting said closed curve into an information sequence represented as a string of bits, wherein an area of each sub-region corresponds to a number of same valued bits in a substring of said string of bits, and a value of the same valued bits corresponds to a signature of at least one of said pair of curve segment that bound the sub-region.

* * * * *